(12) United States Patent
Nagano et al.

(10) Patent No.: US 10,962,709 B2
(45) Date of Patent: Mar. 30, 2021

(54) OPTICAL FIBER AND OPTICAL FIBER GRATING

(71) Applicants: SUMITOMO ELECTRIC INDUSTRIES, LTD., Osaka (JP); SUMITOMO ELECTRIC OPTIFRONTIER CO., LTD., Yokohama (JP)

(72) Inventors: Shigehiro Nagano, Osaka (JP); Masakazu Shigehara, Osaka (JP); Masayuki Yamazaki, Yokohama (JP)

(73) Assignees: SUMITOMO ELECTRIC INDUSTRIES, LTD., Osaka (JP); SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 0 days.

(21) Appl. No.: 17/016,894

(22) Filed: Sep. 10, 2020

(65) Prior Publication Data
US 2020/0408986 A1 Dec. 31, 2020

Related U.S. Application Data

(63) Continuation of application No. PCT/JP2019/010628, filed on Mar. 14, 2019.

(30) Foreign Application Priority Data

Mar. 16, 2018 (JP) .............................. JP2018-049018

(51) Int. Cl.
*G02B 6/028* (2006.01)
*G02B 6/02* (2006.01)

(52) U.S. Cl.
CPC ........ *G02B 6/0281* (2013.01); *G02B 6/02119* (2013.01)

(58) Field of Classification Search
CPC .......................... G02B 6/0281; G02B 6/02119
See application file for complete search history.

(56) References Cited

U.S. PATENT DOCUMENTS 6,289,154 B1 9/2001 Tsuda et al.
7,526,160 B1 4/2009 Homa et al.
(Continued)

FOREIGN PATENT DOCUMENTS

JP S52-088349 A 7/1977
JP H11-119041 A 4/1999
(Continued)

OTHER PUBLICATIONS

D. L. Williams, et al., "Enhanced UV Photosensitivity in Boron Codoped Germanosilicate Fibers", Electronics Letters, vol. 29, No. 1, Jan. 7, 1993, p. 45-47.
(Continued)

*Primary Examiner* — Ellen E Kim
(74) *Attorney, Agent, or Firm* — Oliff PLC

(57) ABSTRACT

An optical fiber according to an embodiment includes a core having a single-peaked and graded refractive index profile, an inner cladding surrounding the core, and an outer cladding surrounding the inner cladding. The inner and outer claddings have refractive indices lower than the maximum refractive index of the core. A photosensitive region constituted by the core and the inner cladding contains a photosensitive material. The inner cladding has an outer diameter one time or more and two times or less the MFD of an $LP_{01}$ mode in a 1310-nm wavelength band.

8 Claims, 25 Drawing Sheets

(56) References Cited

U.S. PATENT DOCUMENTS

| | | | |
|---|---|---|---|
| 2004/0218859 A1 | 11/2004 | Yamashita et al. | |
| 2013/0044987 A1* | 2/2013 | Bickham | G02B 6/0281 385/123 |
| 2016/0097903 A1* | 4/2016 | Li | G02B 6/38 385/50 |
| 2020/0096697 A1* | 3/2020 | Xiao | G02B 6/0281 |

FOREIGN PATENT DOCUMENTS

| | | |
|---|---|---|
| JP | H11-326672 A | 11/1999 |
| JP | 2000-503414 A | 3/2000 |
| JP | 2001-183535 A | 7/2001 |
| JP | 2003-004926 A | 1/2003 |
| JP | 2003-322735 A | 11/2003 |
| JP | 2014-526066 A | 10/2014 |
| WO | 97/026571 A2 | 7/1997 |
| WO | 2013/028513 A1 | 2/2013 |

OTHER PUBLICATIONS

Junji Nishii, et al., "Ultraviolet-radiation-induced chemical reactions through one-and two-photon absorption processes in GeO2—SiO2 glasses", Optics Letters, vol. 20, No. 10, May 15, 1995, p. 1184-1186.

S. Suzuki et al., "Effect on Bragg grating of diffracted beams of phase mask method", 2000 IEICE Electronics Society Conference, 2000, C-3-26, p. 151.

May 28, 2019 International Search Report issued in International Patent Application No. PCT/JP2019/010628.

* cited by examiner

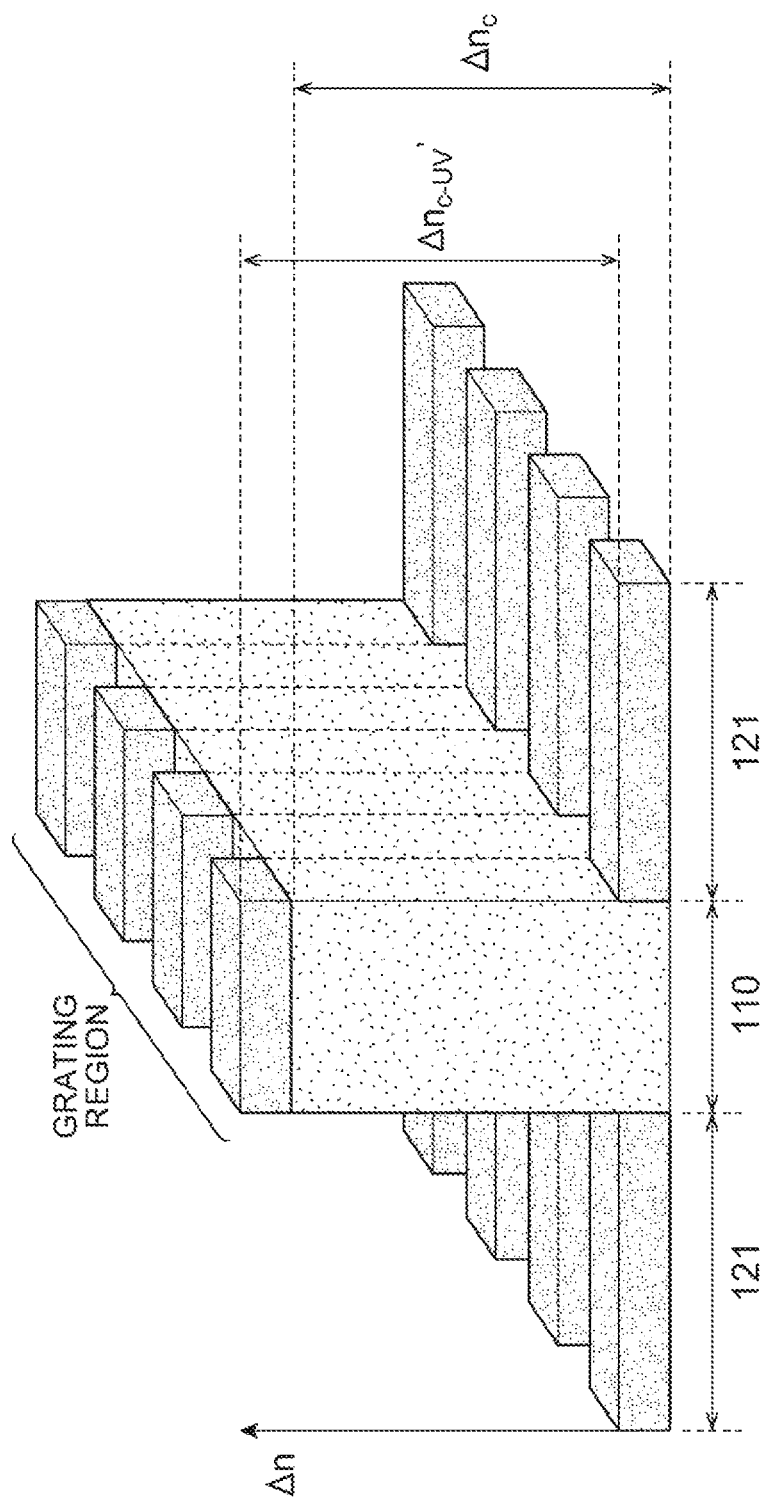

OPTICAL FIBER AND OPTICAL FIBER GRATING

CROSS-REFERENCE TO RELATED APPLICATIONS

This application is a continuation application of PCT/JP2019/010628 claiming the benefit of priority of the Japanese Patent Application No. 2018-049018 filed on Mar. 16, 2018, the entire contents of which are incorporated herein by reference.

TECHNICAL FIELD

The present disclosure relates to an optical fiber and an optical fiber grating.

BACKGROUND ART

When silica-based glass to which a photosensitive material is doped is irradiated with ultraviolet light, the refractive index of the irradiated region increases. Utilizing this phenomenon, an optical fiber grating (TFG: termination fiber grating) is manufactured. Specifically, an optical fiber comprised of silica-based glass is provided with a refractive index modulated region in which the refractive index periodically varies along the longitudinal direction of the optical fiber. An optical fiber grating is used as, for example, a filter for monitoring a passive optical network (PON).

As an example of enabling higher capacity transmission in a PON system, a PON monitoring filter selectively reflects light in a 1650-nm wavelength band ±5 nm for monitoring. On the other hand, the PON monitoring filter transmits not only signal light in a band (for example, C-band which is from 1530 nm to 1565 nm) different from the above wavelength band but also signal light in another band (for example, L-band which is from 1565 nm to 1625 nm), thereby enabling high capacity transmission in a wider wavelength band.

Note that the method for manufacturing an optical fiber grating is disclosed in Patent Documents 1 to 3, for example.

CITATION LIST

Patent Literature

Patent Document 1: Japanese Patent Application Laid-Open No. 2003-004926
Patent Document 2: Japanese Patent Application Laid-Open No. H11-119041
Patent Document 3: Japanese Patent Application Laid-Open No. H11-326672
Patent Document 4: Japanese Patent Application Laid-Open No. 2001-183535

Non-Patent Literature

Non-Patent Document 1: D. L. Williams, et al., "ENHANCED UV PHOTOSENSITIVITY IN BORON CODOPED GERMANOSILICATE FIBERS", ELECTRONICS LETTERS, 7 Jan. 1993, Vol. 29, No. 1, pp 45-47
Non-Patent Document 2: Junji Nishii, et al., "Ultraviolet-radiation-induced chemical reactions through one- and two-photon absorption process in $GeO_2$—$SiO_2$ glasses", OPTICS LETTERS, Vol. 20, No. 10, May 15, 1995, pp 1184-1186
Non-Patent Document 3: "Effect of Diffracted Light on Grating Characteristics in Phase Mask Method", 2000, Engineering Sciences Society Conference of IEICE, C-3-26, P 151

SUMMARY OF INVENTION

An optical fiber according to the present disclosure is comprised of silica-based glass, and includes a core, an inner cladding that surrounds the core, and an outer cladding that surrounds the inner cladding. The core has a single-peaked and graded refractive index profile. The inner cladding has a refractive index lower than the maximum refractive index of the core. The outer cladding has a refractive index lower than the maximum refractive index of the core. Particularly, a photosensitive region constituted by the core and the inner cladding contains a photosensitive material. Further, the inner cladding has an outer diameter one time or more and two times or less the mode field diameter (hereinafter referred to as "MFD") of the $LP_{01}$ mode in a 1310-nm wavelength band.

BRIEF DESCRIPTION OF DRAWINGS

FIG. 6 is a diagram showing a refractive index profile of an optical fiber grating manufactured using an optical fiber according to a second comparative example.

DESCRIPTION OF EMBODIMENTS

Figure 1A:
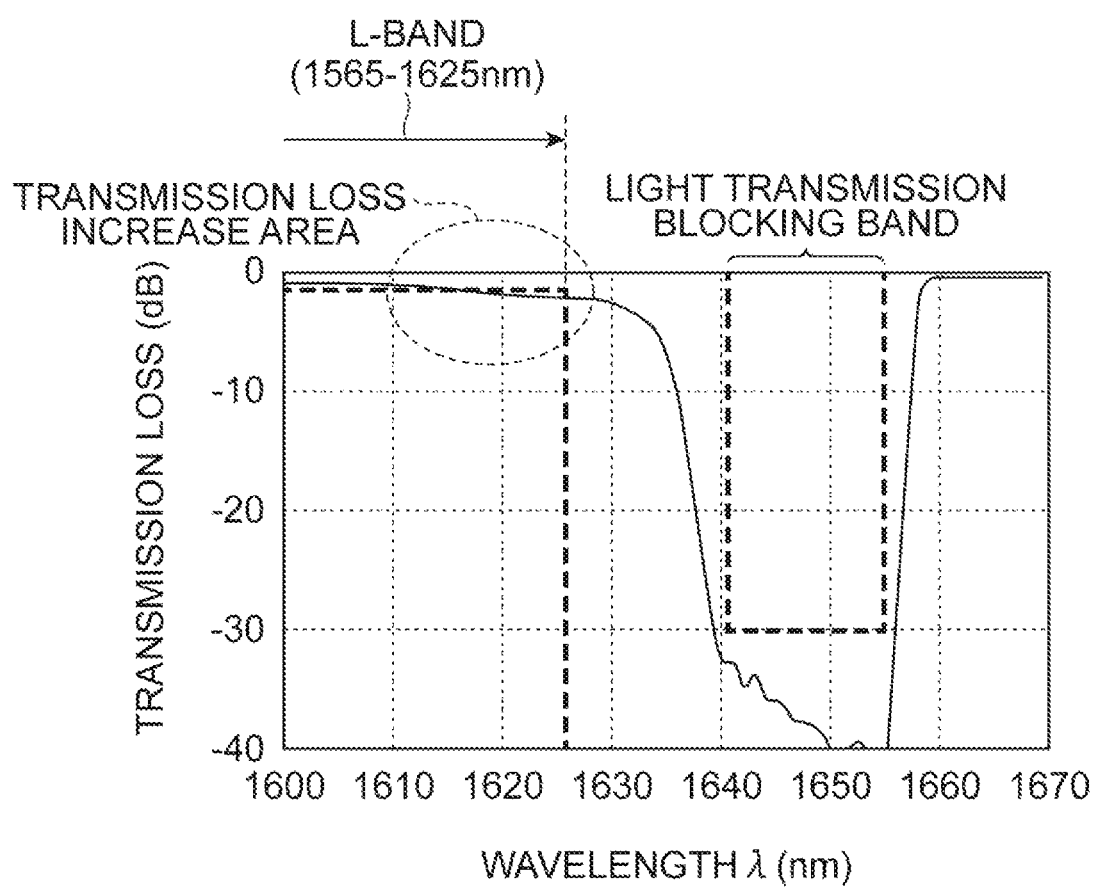
FIG. 1A is a diagram showing an example of a gradual increase in transmission loss of an optical fiber grating.

In the method for manufacturing an optical fiber grating disclosed in Patent Documents 1 and 2, an optical fiber in which both or one of a core and a cladding is comprised of silica-based glass containing a photosensitive material is prepared. This optical fiber is irradiated with ultraviolet light of a specific wavelength (for example, a second harmonic (wavelength of 244 nm) of argon ion laser light) that can increase the refractive index. This makes it possible to increase the refractive index of the silica-based glass containing the photosensitive material.

As a method for forming a refractive index modulated region having a predetermined period in the optical fiber along the longitudinal direction, there are exposure with plus/minus first-order diffracted light using a chirped grating phase mask, direct exposure with laser light, and two-beam interference exposure. Among them, the method using the phase mask is advantageous in that an optical fiber grating having the same characteristics can be manufactured with excellent reproducibility, and that alignment is relatively easy compared to other methods.

$GeO_2$ is a typical photosensitive material. $GeO_2$ is doped to both the core and the cladding, and F is doped to the cladding, whereby a difference in refractive index can be generated between the core and the cladding. However, when only $GeO_2$ is used as the photosensitive material, it is not possible to increase an amount of variation in refractive index caused by ultraviolet light irradiation. This leads to an increase in length of the optical fiber grating required to obtain a predetermined reflection characteristic, and thus entails a problem of an increase in cost for ultraviolet light irradiation.

As a method for addressing this problem, it is known to use $B_2O_3$ in addition to $GeO_2$ as a photosensitive material (see Non-Patent Documents 1 and 2). The co-doping of $GeO_2$ and $B_2O_3$ can increase the amount of variation in the refractive index caused by ultraviolet light irradiation, as compared with the addition of $GeO_2$ alone. Therefore, co-doping of $GeO_2$ and $B_2O_3$ enables a decrease in length of the optical fiber grating and reduction in cost for the ultraviolet light irradiation. Therefore, co-doping $GeO_2$ and $B_2O_3$ as the photosensitive material is preferable.

The refractive index profile in the radial direction of an optical fiber used for manufacturing an optical fiber grating is typically a step-index profile. When the photosensitive material is doped only to the core, a refractive index modulated region in which the refractive index periodically varies along the longitudinal direction of the fiber is formed only in the core. However, an optical fiber grating having this fiber structure has a gradual increase in transmission loss on the short wavelength side of the transmission loss band (see FIGS. 1A and 1B), although it can provide predetermined reflection characteristics in a wavelength band for monitoring.

Figure 1B:
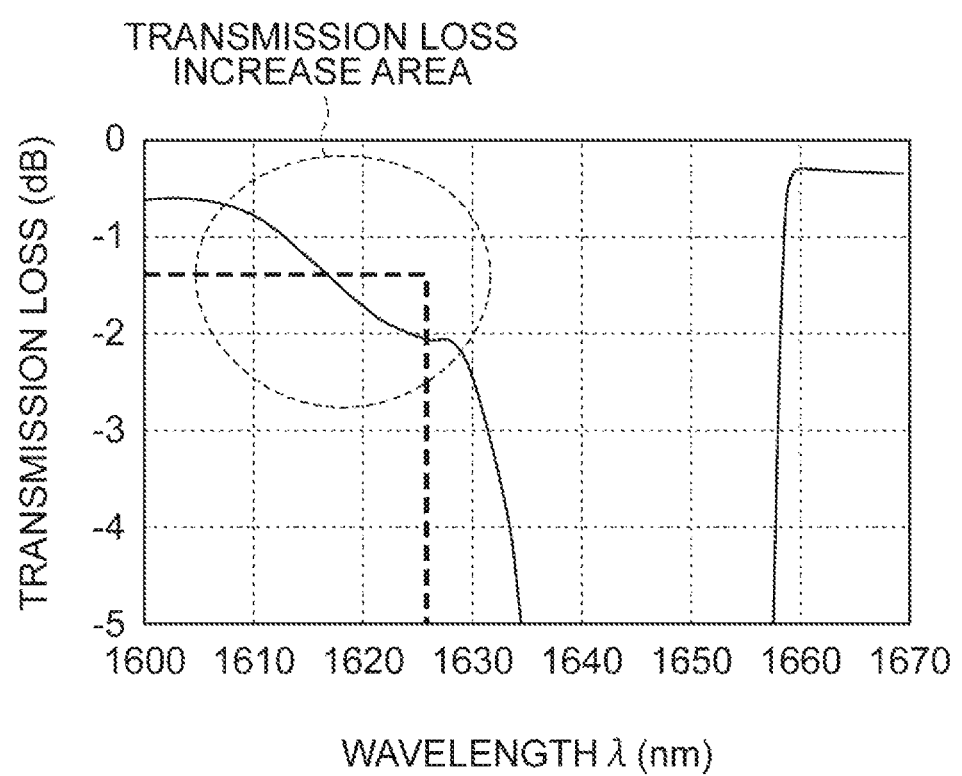
FIG. 1B is an enlarged view of a part of FIG. 1A.

FIG. 1A is a diagram showing an example of a gradual increase in transmission loss of an optical fiber grating. FIG. 1B is an enlarged view of a part of FIG. 1A. In FIG. 1A, the lower limit of transmission loss required in the L-band and the upper limit of transmission loss required in a light transmission blocking band are indicated by dotted lines. In FIG. 1B, the lower limit of transmission loss required in the L-band is indicated by a dotted line. In the example shown in FIGS. 1A and 1B, the light transmission blocking band is from 1640 nm to 1655 nm inclusive, and the transmission loss required in this light transmission blocking band is −30.0 dB or more. In this example, the loss of the optical fiber grating is so large that it cannot be ignored near the long-wavelength end (1625 nm) of the L-band.

The reason why such a gradual increase in transmission loss occurs is that, due to the formation of a refractive index modulated region in a local region of the optical fiber by ultraviolet light irradiation, the orthogonality between an $LP_{01}$ mode (fundamental mode) and a higher-order mode with $LP_{0m}$ (m=2, 3, . . . ) which is symmetrical to the $LP_{01}$ mode with respect to an axis is lost (as a result, a coupling loss from the $LP_{01}$ mode to the higher-order mode occurs).

In order to maintain the orthogonality between the $LP_{01}$ mode and the higher-order mode, it is necessary to form the refractive index modulated region in the entire region where light is sensed in the cross section of the fiber. As a structure that satisfies a condition for maintaining orthogonality for a preferable combination of photosensitive materials by co-doping of $GeO_2$ and $B_2O_3$, it is considered that, for example, $GeO_2$ and $B_2O_3$ which are photosensitive materials are entirely co-doped in both the core and the optical cladding, and F is doped to the optical cladding. With this structure, a sufficient refractive index difference is generated between the core and the optical cladding. However, the compound of $B_2O_3$ and F is one of the difficult-to-treat substances, and this method is not preferable.

On the other hand, in the invention disclosed in Patent Document 3 described above, an optical fiber grating is manufactured using not an optical fiber having a step-index profile but an optical fiber that includes a core having a single-peaked and graded refractive index profile. According to the disclosure of Patent Document 3, due to the optical fiber to be applied having such a single-peaked and graded refractive index profile, a variation in relative refractive index difference and a variation in propagation mode in the longitudinal direction at the interface between the core and the cladding of the optical fiber can be reduced, whereby a cladding mode coupling loss can be suppressed. Further, according to the disclosure of Patent Document 3, when the light transmission blocking wavelength band by the optical fiber grating is from about 1640 nm to about 1660 nm, it is possible to suppress the light transmission loss occurring in the 1520-nm wavelength band, so that the light transmission loss in the used wavelength band (about 1550-nm band) of the optical fiber grating can be decreased.

Problems to Be Solved by the Present Disclosure

As a result of examining conventional optical fibers and optical fiber gratings, the inventors have found the following problems. That is, the invention disclosed in the above Patent Document 3 has a problem that, when the light transmission blocking wavelength band by the optical fiber grating is from about 1640 nm to about 1660 nm, it is possible to suppress the light transmission loss occurring in the 1520-nm wavelength band, whereas the transmission loss at the long-wavelength end (1625 nm) in the L-band increases to a level that cannot be ignored (at least about 5 dB or more). This is considered to be because the spread of the light intensity distribution in the $LP_{01}$ mode is larger than that in the grating region. That is, it is considered that in such a situation, the orthogonality between the $LP_{01}$ mode and the higher-order mode ($LP_{0m}$ mode) is reduced, and as a result, the coupling from the $LP_{01}$ mode to the $LP_{0m}$ mode occurs. Therefore, the optical fiber grating according to the invention disclosed in Patent Document 3 is not suitable for a PON monitoring filter of a PON system that enables high capacity transmission in a wide wavelength band using L-band signal light.

The present disclosure has been made to solve the above problems, and an object of the present disclosure is to provide an optical fiber grating in which a gradual increase in transmission loss is reduced, and an optical fiber suitable for manufacturing the optical fiber grating.

Effects of the Present Disclosure

According to the present disclosure, an optical fiber grating in which a gradual increase in transmission loss is reduced, and an optical fiber suitable for manufacturing the optical fiber grating can be provided.

DESCRIPTION OF EMBODIMENTS OF THE PRESENT INVENTION

First, the details of the embodiment of the present disclosure will be individually listed and described.

(1) An optical fiber according to the present disclosure is comprised of silica-based glass, and as one aspect thereof, includes a core, an inner cladding surrounding the core, and an outer cladding surrounding the inner cladding. The core has a single-peaked and graded refractive index profile. The inner cladding has a refractive index lower than the maximum refractive index of the core. The outer cladding has a refractive index lower than the maximum refractive index of the core. Particularly, a photosensitive region constituted by the core and the inner cladding contains a photosensitive material. The inner cladding has an outer diameter one time or more and two times or less the MFD of the $LP_{01}$ mode in a 1310-nm wavelength band.

In the present specification, "silica-based glass" indicates glass containing 50% by mass or more of $SiO_2$. Further, the relative refractive index $nr_i$ of each region having a refractive index $n_i$ with respect to pure silica glass (refractive index $n_{silica}$) is specified by the formula of $$nr_i = n_i/n_{silica}$$

and the relative refractive index difference $\Delta$ between the region having the refractive index $n_1$ and the region having the refractive index $n_2$ is specified by the formula of $$\Delta = |nr_1 - nr_2|.$$

Further, in order to avoid the effect of unintended or small variations in the refractive index profile, it is determined that the "single-peaked profile" is formed, if there is only one peak in a refractive index obtained by moving average using an average of refractive indices n(r) in the interval of 5 μm, not in the measured value of the refractive index n(r).

(2) As one aspect of the present disclosure, the photosensitive region preferably contains both Ge and B as a photosensitive material.

(3) As one aspect of the present disclosure, it is preferable that a difference between a maximum concentration and a minimum concentration of B in the photosensitive region is 0.3% or less in terms of a variation in relative refractive index induced by the B-doping, and in this case, it is preferable that a concentration of Ge in an outermost region of the photosensitive region (outermost region of the inner cladding) is 0.35% or more in terms of a variation in relative refractive index induced by the Ge-doping.

(4) As one aspect of the present disclosure, it is preferable that the refractive index of the inner cladding is substantially equal to a refractive index of pure silica glass because of an offset between an amount of increase in refractive index induced by the Ge-doping and an amount of decrease in refractive index induced by the B-doping. In the present specification, "being substantially equal" means a state in which the relative refractive index between two regions to be compared is 0.02% or less.

(5) As one aspect of the present disclosure, it is preferable that, in the inner cladding, an amount of increase in refractive index induced by the Ge-doping is greater than an amount of decrease in refractive index induced by the B-doping, and the outer cladding contains chlorine. In this configuration, it is also preferable that the refractive index of the inner cladding and the refractive index of the outer cladding are substantially equal to each other.

(6) As one aspect of the present disclosure, it is preferable that the single-peaked and graded refractive index profile is an α-profile having an exponent α greater than 0.5 and smaller than 5.0. Further, as one aspect of the present disclosure, it is preferable that the relative refractive index difference between the core and the inner cladding is 0.4% or more and 1.0% or less. In the α-profile, when the maximum refractive index of the core is $n_1$, the minimum refractive index of the core is $n_2$, and the radius of the core is a, the refractive index n(r) at the position with the distance r (<a) from the center of the core along the radial direction is specified by the equation of $$n(r) = n1[1 - 2\Delta(r/a)^\alpha]^{1/2}.$$

By adjusting the exponent α in the above equation, the shape of the refractive index profile can be set arbitrarily.

In addition, in the optical fiber according to the present disclosure having the above-described structure, the appropriate cutoff wavelength range is from 0.9 µm to 1.3 µm inclusive. In addition, the bending loss in the 1.55-µm wavelength band, in the condition that the optical fiber is wound 10 times around a mandrel with a diameter of 30 mm, is preferably 5 dB or less.

(7) An optical fiber grating according to the present disclosure includes, as one aspect, the optical fiber having the above-mentioned structure, and has a refractive index modulated region provided along the longitudinal direction of the optical fiber. The refractive index modulated region is a region where the refractive index periodically varies along the longitudinal direction of the optical fiber, and is provided in the photosensitive region. However, the variation period of the refractive index may continuously change along the longitudinal direction.

Each of the aspects listed in [Description of Embodiment of the Present Disclosure] described above is applicable to all of the remaining aspects or all combinations of the remaining aspects.

DETAILED DESCRIPTION OF EMBODIMENT OF THE PRESENT DISCLOSURE

Hereinafter, a specific structure of the optical fiber and the optical fiber grating according to the present disclosure will be described in detail with reference to the accompanying drawings. It should be noted that the present disclosure is not limited to the description below, and is intended to include all modifications within the spirit and scope as defined by the appended claims and their equivalents. In the following description with reference to the drawings, the same elements are denoted by the same reference numerals, and redundant description is omitted.

The structure of an optical fiber suitable for producing an optical fiber grating having a light transmission blocking wavelength band from about 1640 nm to about 1660 nm and having a low loss at the long-wavelength end of 1625 nm in the L-band will be described below. A case where $GeO_2$ and $B_2O_3$ are co-doped as a photosensitive material in order to generate a great variation in refractive index at high speed will be described. In the following, first, a comparative example will be described, and then an embodiment will be described.

Figure 2:
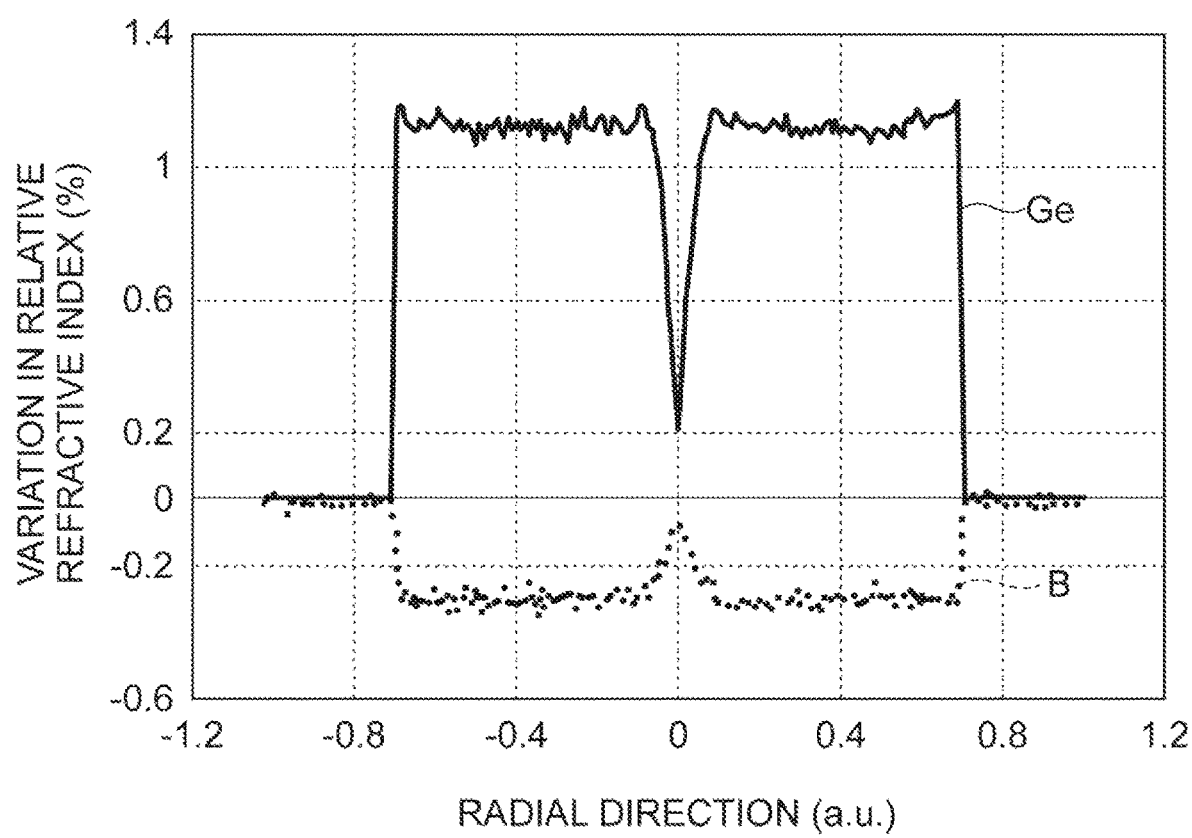
FIG. 2 is a diagram showing a Ge concentration distribution induced by Ge-doping and a B concentration distribution induced by B-doping along the radial direction of an optical fiber according to a first comparative example.
Figure 3:
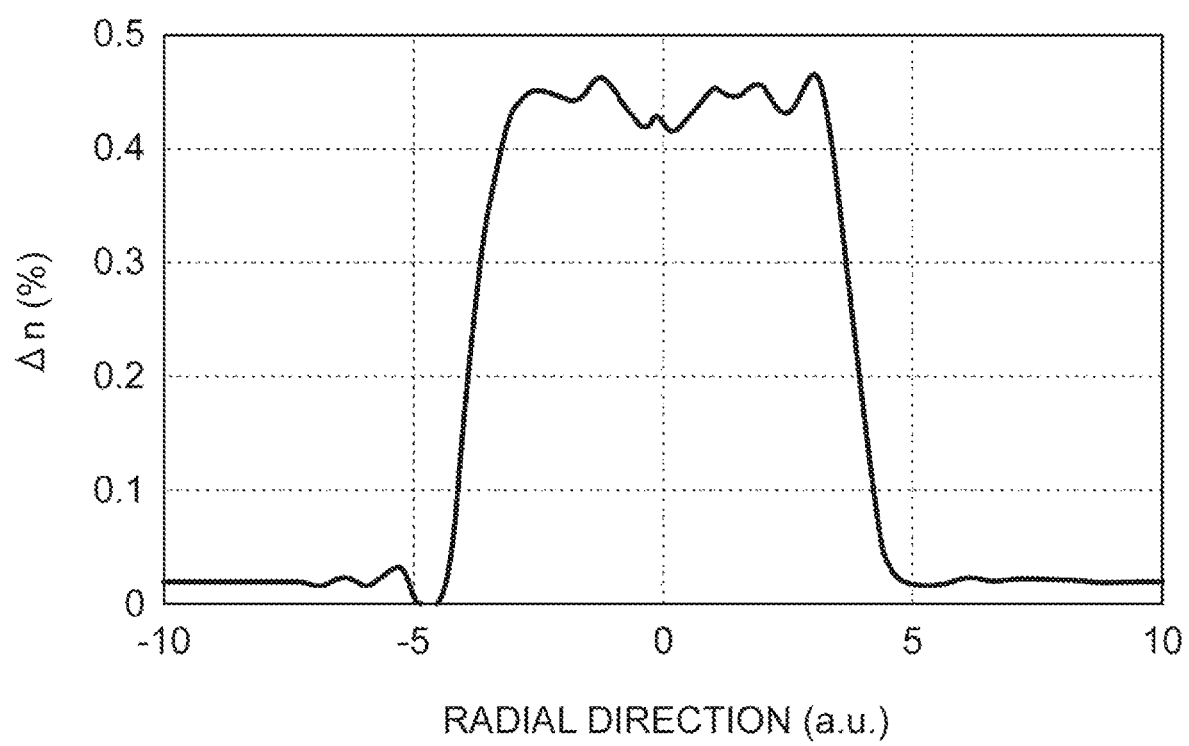
FIG. 3 is a diagram showing a refractive index profile along the radial direction of the optical fiber according to the first comparative example.

FIG. 2 is a diagram showing a concentration distribution induced by Ge-doping and a concentration distribution induced by B-doping along the radial direction of an optical fiber according to a first comparative example. FIG. 3 is a diagram showing a radial refractive index profile of the optical fiber according to the first comparative example. The optical fiber according to the first comparative example has a step-index refractive index profile, and only a core out of the core and a cladding is doped with a photosensitive material. In the example shown in FIG. 2, the photosensitive material is doped almost uniformly to the peripheral region of the core excluding the central region, and an amount of Ge doped to the core is 1.1% in terms of a variation in relative refractive index induced by the Ge-doping. The amount of B doped to the core is −0.4% in terms of a variation in relative refractive index induced by the B-doping. The region where the relative refractive index nr indicated by the vertical axis in FIGS. 2 and 3 is positive indicates a range where the refractive index is higher than the refractive index (reference) of pure silica glass, and the region where the relative refractive index nr is negative indicates a region where the refractive index is lower than the refractive index (reference) of pure silica glass.

Figure 4:
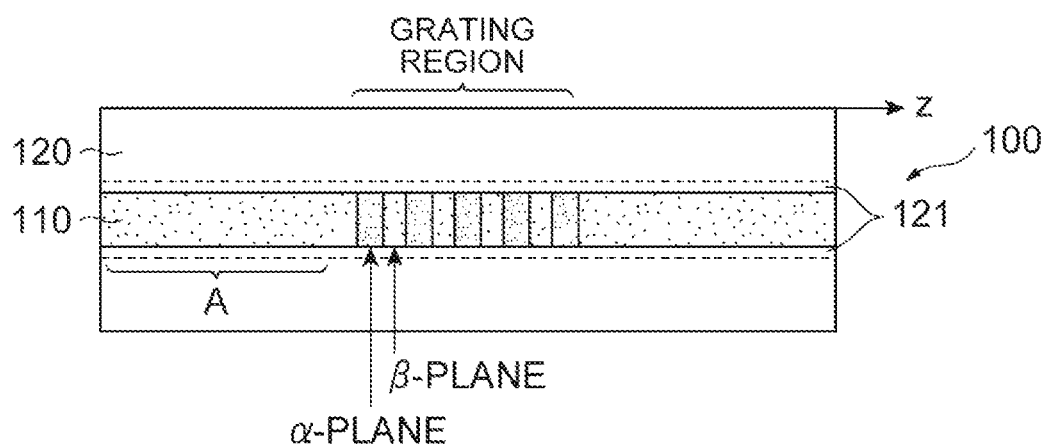
FIG. 4 is a diagram showing a cross-sectional structure of an optical fiber grating manufactured using the optical fiber according to the first comparative example.
Figure 5A:
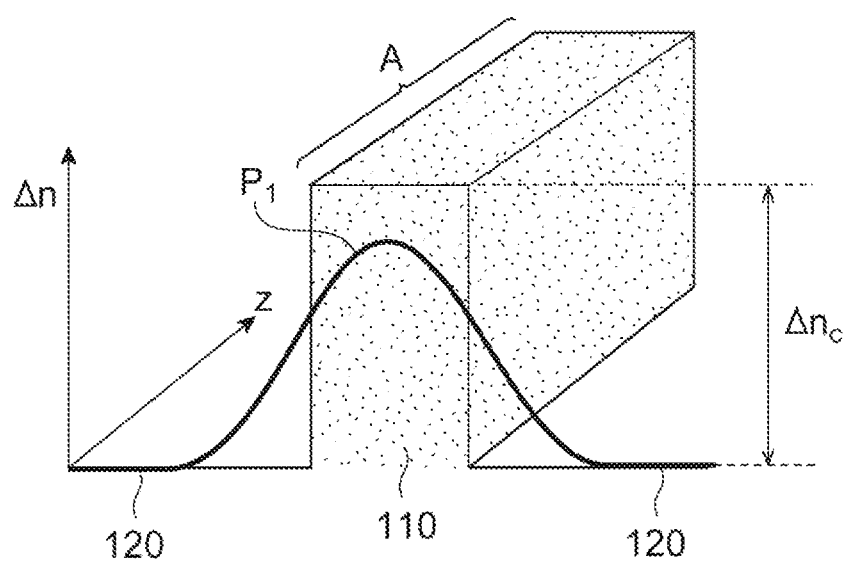
FIG. 5A is a diagram for describing the reason (reason 1) why a transmission loss gradually increases in the optical fiber grating shown in FIG. 4.
Figure 5B:
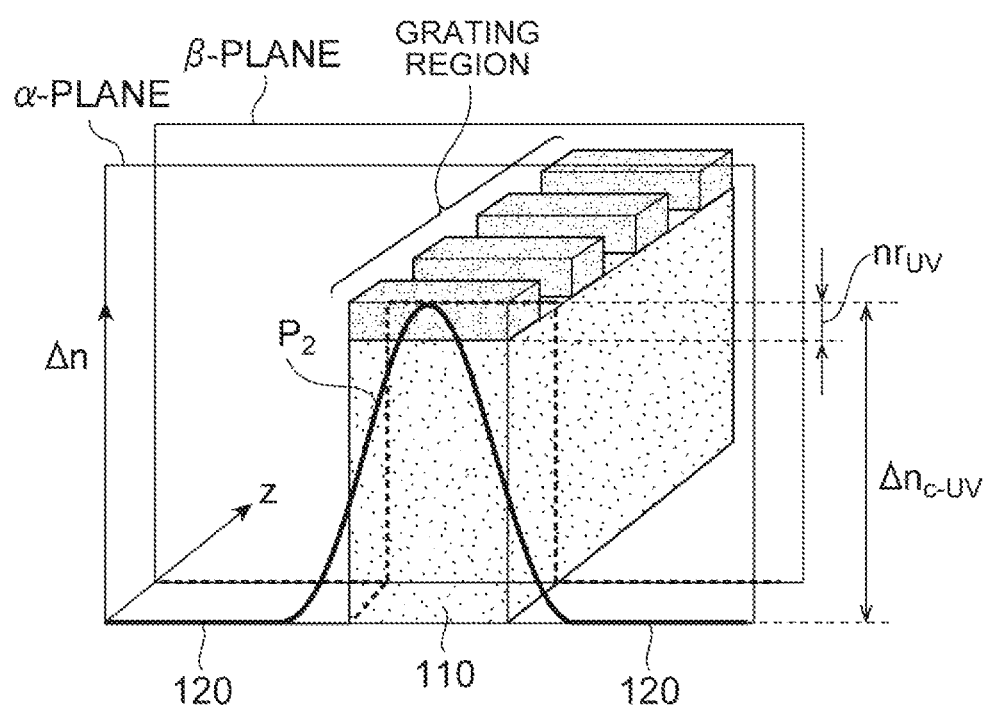
FIG. 5B is a diagram for describing the reason (reason 2) why a transmission loss gradually increases in the optical fiber grating shown in FIG. 4.

FIG. 4 is a diagram showing a cross-sectional structure of an optical fiber grating 100 manufactured using the optical fiber according to the first comparative example. Note that FIG. 4 also shows the structure of an optical fiber according to a second comparative example described later. FIGS. 5A and 5B are diagrams for describing reasons why a transmission loss gradually increases in the optical fiber grating 100 shown in FIG. 4. The optical fiber according to the first comparative example includes a core 110 and a cladding 120, and a grating region (refractive index modulated region) in which the refractive index periodically varies along the longitudinal direction of the optical fiber is formed in the core 110. A gradual increase in transmission loss occurs when the $LP_{01}$ mode of monitoring light is coupled to the $LP_{0m}$ mode, which is a higher-order mode and which is symmetrical to the $LP_{01}$ mode with respect to an axis. The relative refractive index difference between the core 110 and the cladding 120 of the optical fiber before being irradiated with ultraviolet light is defined as $\Delta n_C$. The relative refractive index difference between the core 110 and the cladding 120 when the relative refractive index of the core 110 varies by $nr_{UV}$ due to the ultraviolet light irradiation is defined as $\Delta n_{C-UV}$.

As shown in FIG. 5B, when only the core 110 has a periodical variation in an amount corresponding to the variation $nr_{UV}$ in relative refractive index along the longitudinal direction, a relative refractive index difference that periodically varies between $\Delta n_{C-UV}(=nr_{UV}+\Delta n_C)$ and $\Delta n_C$ in relation to the light propagation direction appears. The MFD of the $LP_{01}$ mode varies depending on the periodically varying relative refractive index difference. That is, the light intensity distribution in the case where the relative refractive index difference is $\Delta n_C$ (β-plane in the figure) is $P_1$, and the light intensity distribution in the case where the relative refractive index difference is $\Delta n_{C-UV}$ (α-plane in the figure) is $P_2$. $P_1$ and $P_2$ have a relationship of $P_1 \neq P_2$. As a result, it is considered that scattering occurs due to variations in the light intensity distribution along the light propagation direction, and the scattering light is coupled with the high-order mode to cause a gradual increase in transmission loss as shown in FIGS. 1A and 1B. Note that, on the β-plane, the light intensity distribution is the same as that of a region A in which the periodical variation in refractive index does not occur as shown in FIG. 5A.

Next, the structure of an optical fiber according to a second comparative example will be described. The optical fiber according to the second comparative example is comprised of silica-based glass, has a step-index refractive index profile, and includes, as shown in FIG. 4, a core 110, and an inner cladding and an outer cladding which surround the core 110 and which have refractive indices lower than the refractive index of the core 110. In FIG. 4, an inner cladding (optical cladding) 121 is shown as a part of the cladding 120 (a region between the core 110 and a broken line). Therefore, in the optical fiber according to the second comparative example, the outer cladding corresponds to a region provided outside the inner cladding 121 of the cladding 120 shown in FIG. 4. The inner cladding 121 is adjacent to the core 110 and surrounds the core 110. The outer cladding is adjacent to the inner cladding 121 and surrounds the inner cladding 121. In the optical fiber according to the second comparative example, a photosensitive region constituted by the core 110 and the inner cladding 121 contains a photosensitive material. Specifically, the photosensitive region contains both Ge and B as the photosensitive material.

In the optical fiber according to the second comparative example, even if there is a periodic variation in an amount corresponding to the variation $nr_{UV}$ in relative refractive index induced by ultraviolet light irradiation, an amount of variation in the light intensity distribution in the $LP_{01}$ mode along the longitudinal direction is suppressed in order to suppress the deterioration in the orthogonality between the $LP_{01}$ mode and the $LP_{0m}$ mode which is a higher-order mode. That is, the inner cladding 121 has an outer diameter equal to or larger than the MFD of the $LP_{01}$ mode in a wavelength of 1310 nm. The specific outer diameter of the inner cladding 121 is preferably 8 µm or more and 14 µm or less, and more preferably 9 µm or more and 13 µm or less. In addition, in the optical fiber according to the second comparative example, it is preferable that the photosensitive material is substantially uniformly doped to the photosensitive region (the core 110 and the inner cladding 121). The MFD is preferably 7.5 µm or more and 9.0 µm or less. The core 110 is a region having a relative refractive index higher by +0.01% or more than the average relative refractive index of the inner cladding 121.

FIG. 6 is a diagram showing a refractive index profile of an optical fiber grating manufactured using the optical fiber according to the second comparative example. In the optical fiber grating produced by using the optical fiber according to the second comparative example, the periodic variation in an amount corresponding to the variation $nr_{UV}$ ($=\Delta n_{C-UV} - \Delta n_C$) in relative refractive index along the longitudinal direction appears not only in the core 110 but also in the inner cladding 121. As an ideal structure in that case, the relative refractive index difference $\Delta n_{C-UV}$ between the core 110 and the inner cladding 121 can be made equal to $\Delta n_C$, by which fluctuations of the $LP_{01}$ mode in the light propagation direction can be suppressed. That is, the optical fiber grating has a structure in which, in the entire light propagation region, periodic variation in an amount corresponding to the variation $nr_{UV}$ in relative refractive index occurs along the longitudinal direction, and the orthogonality between the $LP_{01}$ mode and the higher-order mode is maintained. In order to realize this structure, it is considered to use a method for reducing the refractive index of the inner cladding by adding F only to the inner cladding 121 to which Ge and B are co-doped. However, this method is not preferable in terms of production, because the compound of B and F is a difficult-to-treat substance.

Figure 7:
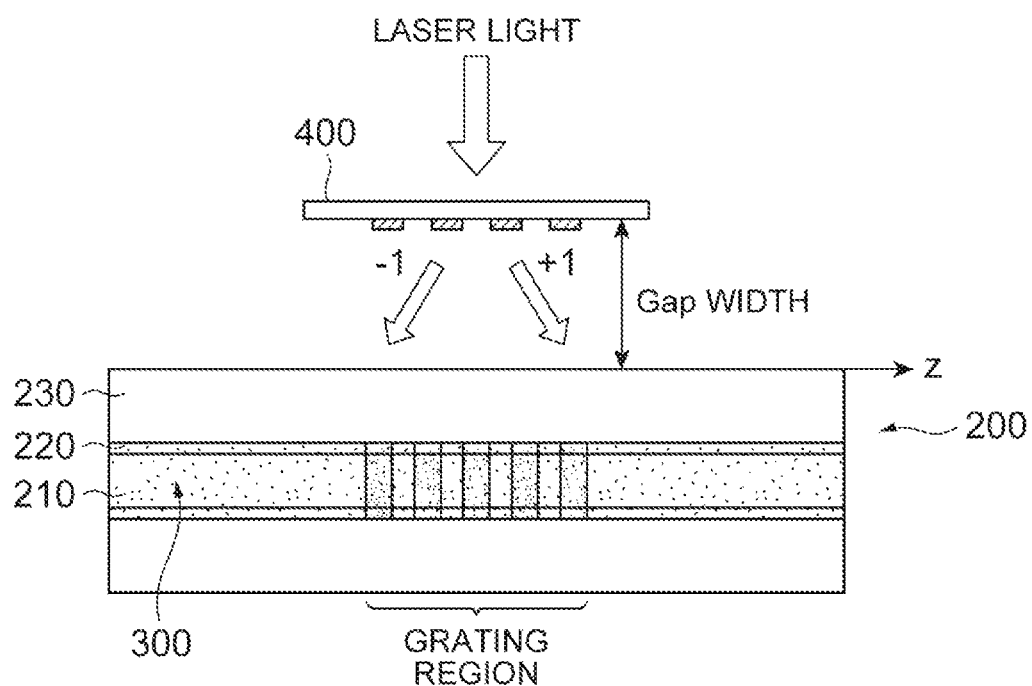
FIG. 7 is a diagram showing a cross-sectional structure of an optical fiber grating manufactured using the optical fiber according to one embodiment.

Next, the structure of the optical fiber according to the embodiment of the present disclosure will be described. FIG. 7 is a diagram showing a cross-sectional structure of an optical fiber grating 200 manufactured using the optical fiber according to the embodiment. The optical fiber according to the embodiment includes a core 210, an inner cladding (optical cladding) 220 surrounding the core 210 and having a refractive index lower than that of the core 210, and an outer cladding 230 surrounding the inner cladding 220. Further, a photosensitive region 300 constituted by the core 210 and the inner cladding 220 contains both Ge and B as a photosensitive material. In the example of FIG. 7, a grating region is formed in the photosensitive region 300 by irradiating the optical fiber according to the embodiment with a laser beam via a phase mask 400 disposed apart from the optical fiber with a predetermined distance (Gap width).

While the optical fiber according to the second comparative example described above has a step-index refractive index profile, the core 210 of the optical fiber according to the embodiment has a single-peaked and graded refractive index profile. The inner cladding 220 has an outer diameter one time or more and two times or less the MFD of the $LP_{01}$ mode in a 1310-nm wavelength band.

Figure 8:
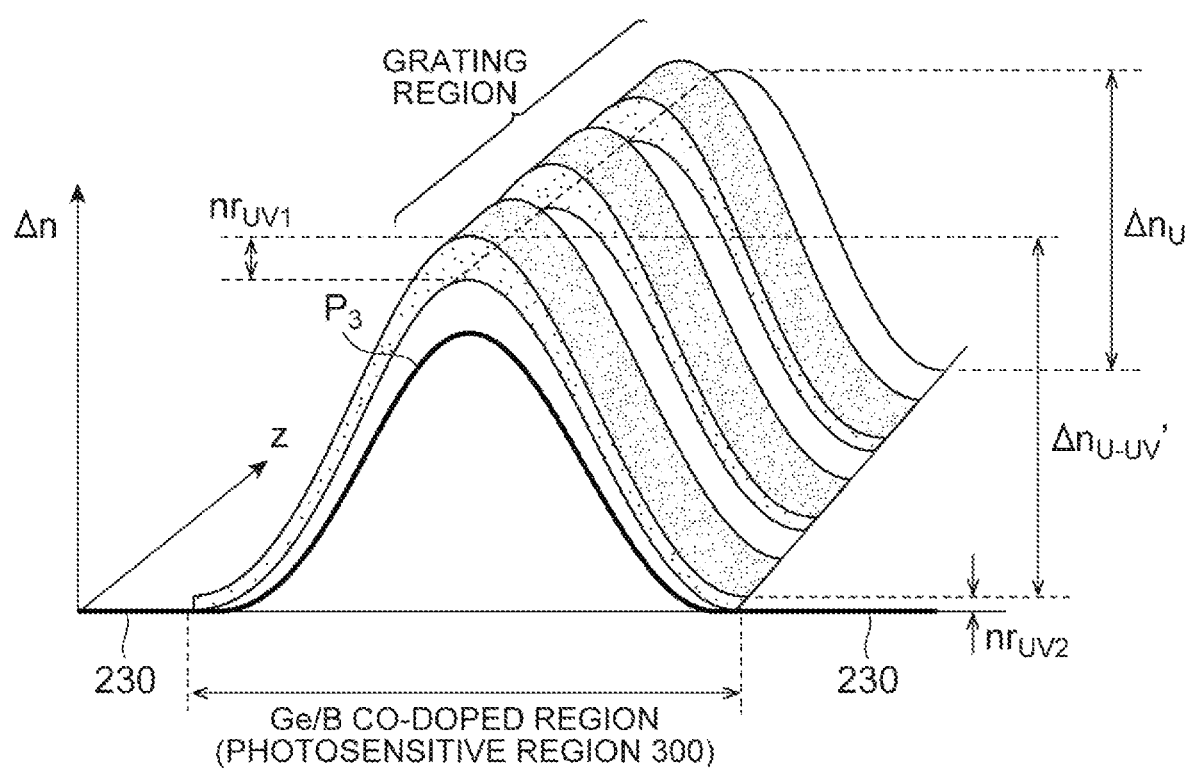
FIG. 8 is a diagram showing a refractive index profile of an optical fiber grating manufactured using the optical fiber according to the embodiment.
Figure 9:
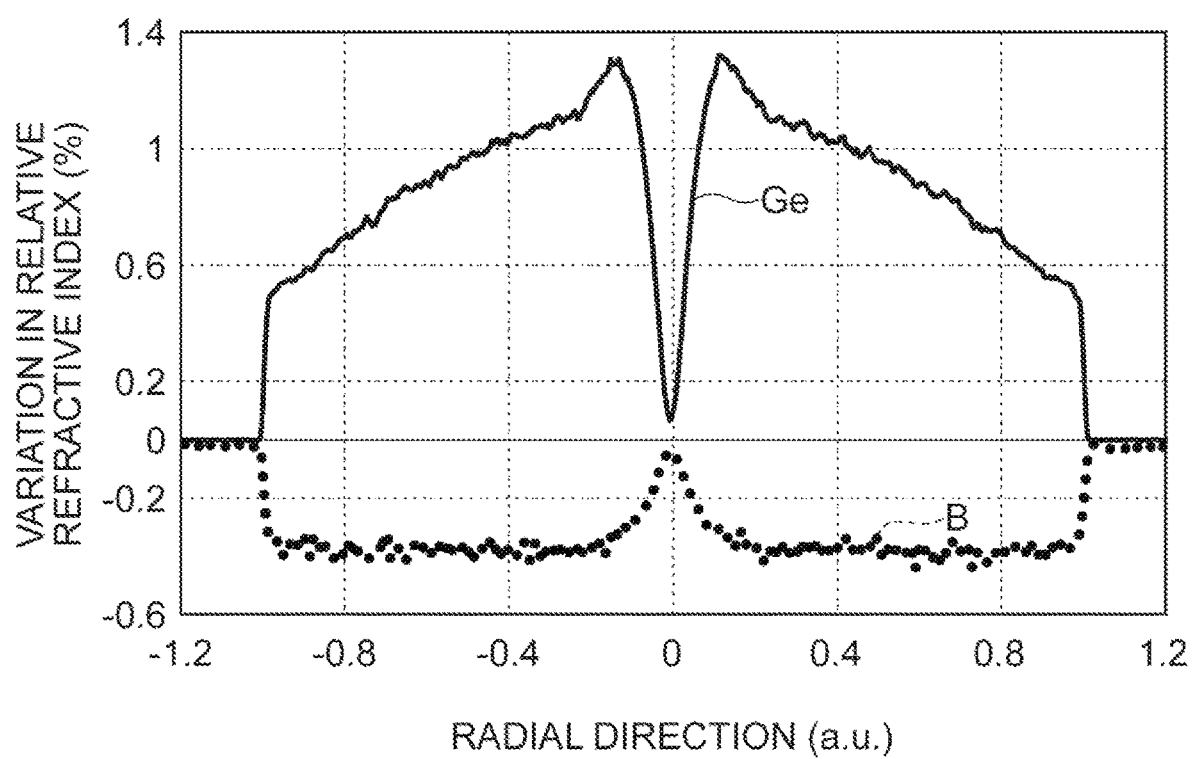
FIG. 9 is a diagram showing a Ge concentration distribution induced by Ge-doping and a B concentration distribution induced by B-doping along the radial direction of the optical fiber according to the embodiment.
Figure 10:
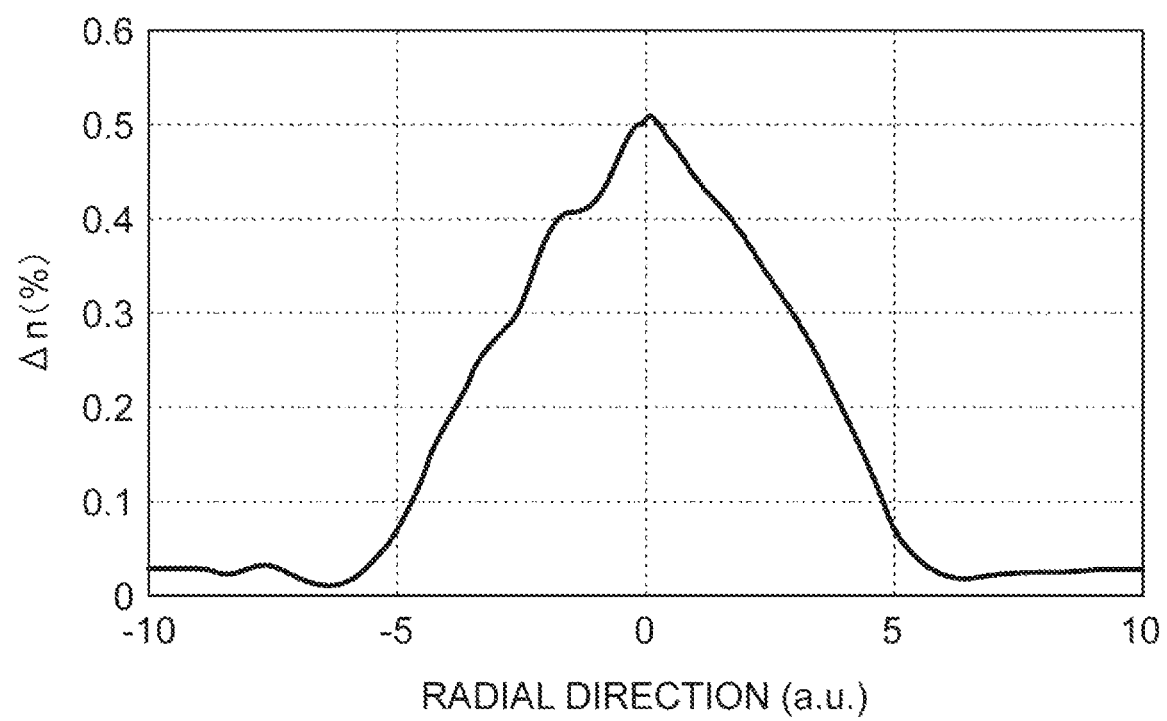
FIG. 10 is a diagram showing a refractive index profile along the radial direction of the optical fiber according to the embodiment.

FIG. 8 is a diagram showing a refractive index profile of the optical fiber grating 200 manufactured using the optical fiber according to the embodiment of the present disclosure. FIG. 9 is a diagram showing a Ge concentration distribution (concentration distribution induced by Ge-doping) and a B concentration distribution (concentration distribution induced by B-doping) along the radial direction of the optical fiber according to the embodiment of the present disclosure. FIG. 10 is a diagram showing a refractive index profile along the radial direction of the optical fiber according to the embodiment of the present disclosure. A dip where an amount of additive is low is generated in the central region of the core 210 due to reasons of the manufacturing process, but the additive diffuses when the optical fiber preform is drawn during the manufacture of the optical fiber. Therefore, an optical fiber having a single-peaked and graded refractive index profile as shown in FIG. 10 can be obtained.

First, as shown in FIG. 9, B is substantially uniformly doped in the photosensitive region 300 (co-doped region constituted by the core 210 and the inner cladding 220) excluding the central region (dip). The doped amount of B is preferably in the range of −0.1% to −0.6% in terms of the variation in relative refractive index induced by the B-doping. In order to reduce the non-uniformity of the refractive index in the cross section of the fiber, the difference between the maximum and the minimum of the doped amount of B (B concentration) in the region excluding the central dip is preferably 0.3% or less in terms of the variation in relative refractive index induced by the B-doping.

Similar to B, Ge is doped to the core 210 and the inner cladding 220. The doped amount of Ge (Ge concentration) in the outermost region of the inner cladding 220 is preferably 0.35% or more in terms of a variation in relative refractive index induced by Ge-doping. When the Ge concentration is less than 0.35% in terms of the variation in relative refractive index induced by the Ge-doping, the amount of variation $nr_{UV}$ in relative refractive index becomes extremely small, which is not effective. On the other hand, rather than adjusting the B concentration to have an α-profile, adjusting the range where the Ge concentration is 0.35% or more in terms of the variation in relative refractive index induced by the Ge-doping to have an α-profile is better to make the amount of variation $nr_{UV}$ in relative refractive index induced by ultraviolet light more uniform in the cross section of the fiber. From the above, regarding creating an α-profile, controlling the Ge concentration is more effective than controlling the B concentration. The relative refractive index difference between the core 210 and the inner cladding 220 is preferably 0.4% or more.

As shown in FIG. 8, an amount of variation $nr_{UV1}$ in relative refractive index in the center of the photosensitive region 300 and an amount of variation $nr_{UV2}$ in relative refractive index at the end of the photosensitive region 300 are different in a strict sense, because the concentration of doped Ge is different. However, $nr_{UV1}$ can be regarded to be substantially equal to $nr_{UV2}$. As a result, regarding the relative refractive index difference $\Delta n_{U-UV}$, $\Delta n_{U-UV} \approx \Delta n_U$ is established, and the variation amount of the light intensity distribution P3 is negligibly small with respect to the propagation direction of the $LP_{01}$ mode at a wavelength of 1310 nm. The relative refractive index difference $\Delta n_{U-UV}$ is a difference between a value obtained by adding the amount of variation $nr_{UV1}$ in relative refractive index at the center of the photosensitive region 300 to the relative refractive index difference $\Delta n_U$ between the outer cladding 230 in the non-ultraviolet irradiation region (outside the grating region) and the center of the photosensitive region 300 and a value obtained by adding the amount of variation $nr_{UV2}$ in relative refractive index at the end of the photosensitive region 300 to the relative refractive index difference of the outer cladding 230. The exponent $\alpha$ of the refractive index profile for suppressing the variation amount of P3 preferably satisfies $0.5<\alpha<5$.

Figure 11A:
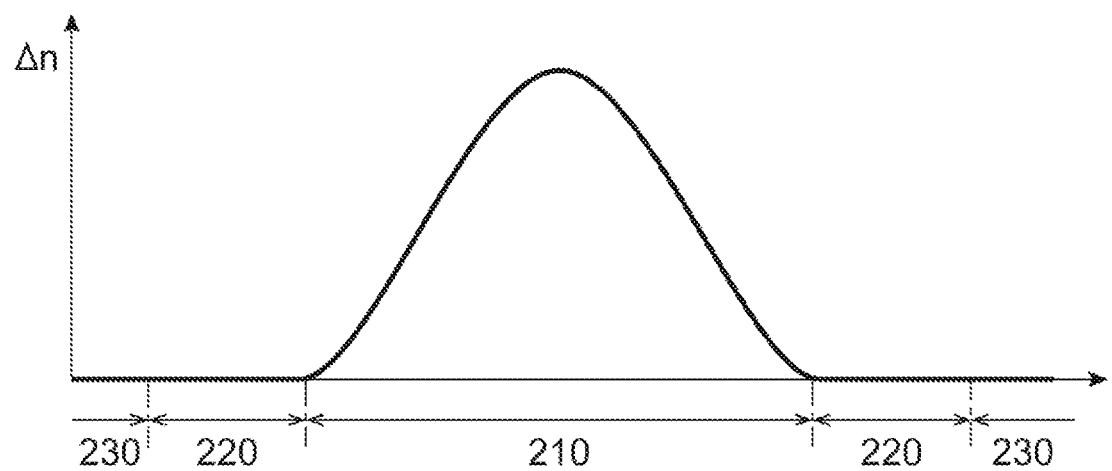
FIG. 11A is a diagram schematically showing a refractive index profile of the optical fiber according to the embodiment.
Figure 11B:
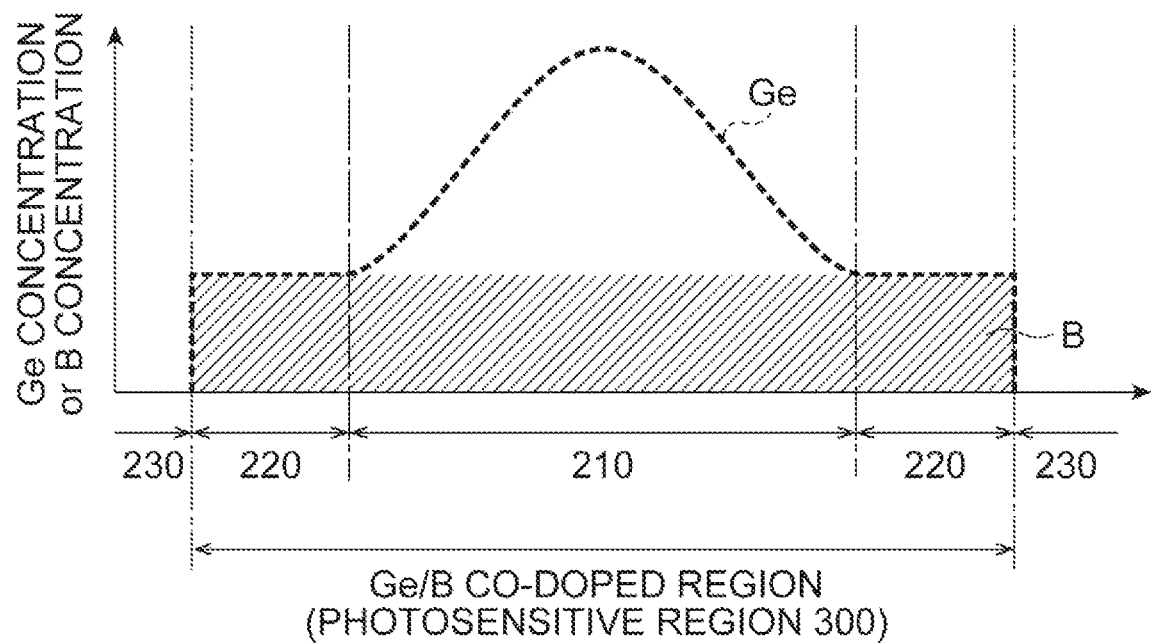
FIG. 11B is a diagram for describing a co-doped region (photosensitive region) in which Ge and B are co-doped in the optical fiber in FIG. 11A (Part 1).
Figure 11C:
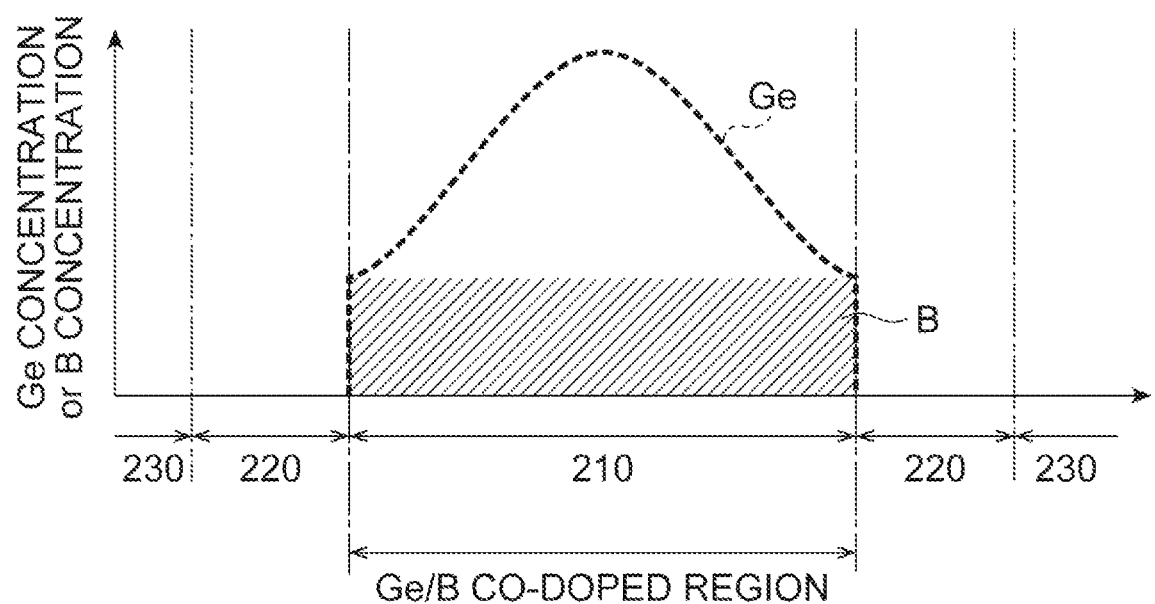
FIG. 11C is a diagram for describing a co-doped region (photosensitive region) in which Ge and B are co-doped in the optical fiber in FIG. 11A (Part 2).

FIG. 11A shows a refractive index profile of the optical fiber according to the embodiment of the present disclosure, and FIGS. 11B and 11C are diagrams for describing a co-doped region (corresponding to the photosensitive region 300) in which Ge and B are co-doped in the optical fiber. The co-doped region may be set to be the same as the core 210 (FIG. 11C) or may be set to a region including the core 210 and wider than the core 210 (FIG. 11B). The important point is that the diameter of the co-doped region is equal to or greater than the MFD of the $LP_{01}$ mode at a wavelength of 1310 nm. The diameter of the co-doped region may be two times or more the MFD, but if the co-doped region is too large, the absorption of ultraviolet light for writing the grating will increase, which increases variations in the amount of variation $nr_{UV}$ in relative refractive index in the cross section of the fiber, and thus ineffective. Therefore, it is preferable that the diameter of the co-doped region is one time or more and two times or less the MFD of the $LP_{01}$ mode at a wavelength of 1310 nm.

In addition, when Ge and B are co-doped, the amount of variation $nr_{UV}$ in relative refractive index increases, as compared with the case where only Ge is doped as the photosensitive material, so that the optical fiber grating 200 can be decreased in length. Specifically, the optical fiber grating 200 can be downsized to 10 mm or less in length.

Figure 12A:
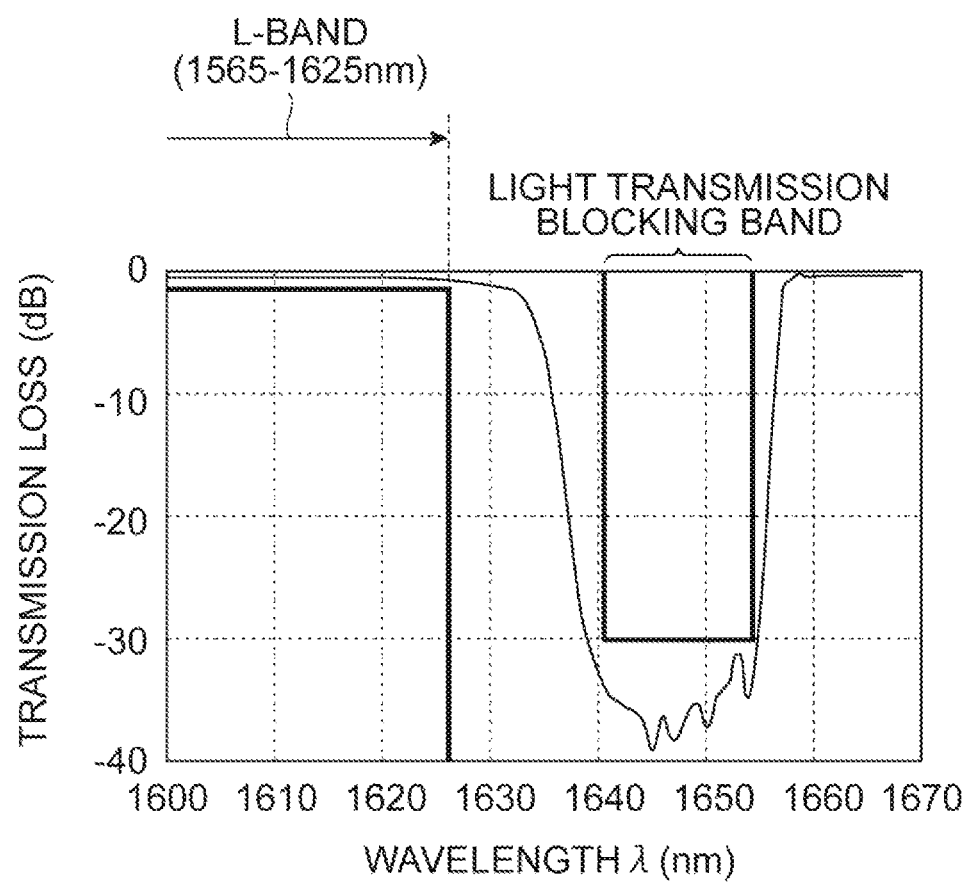
FIG. 12A is a diagram showing an example of transmission characteristics of an optical fiber grating manufactured using the optical fiber according to the embodiment.
Figure 12B:
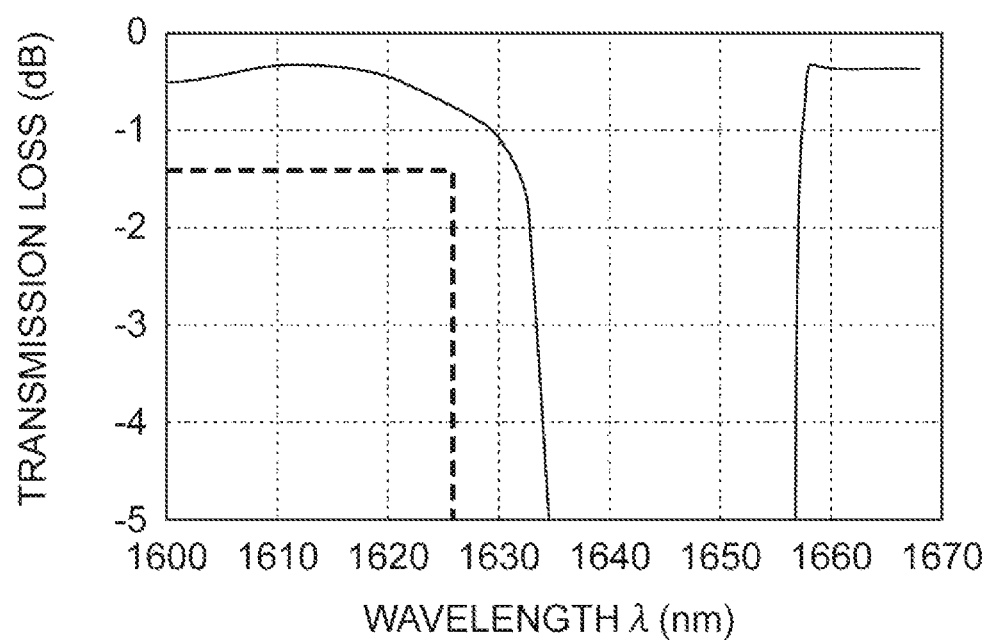
FIG. 12B is an enlarged view of a part of FIG. 12A.

FIG. 12A is a diagram showing an example of transmission characteristics of the optical fiber grating 200 manufactured using the optical fiber according to the embodiment of the present disclosure. FIG. 12B is an enlarged view of a part of FIG. 12A. Compared to the example of FIGS. 1A and 1B, a gradual increase in transmission loss within a range from 1610 nm to 1625 nm is reduced, so that the transmission loss at 1625 nm is suppressed to about –0.8 dB in the transmission characteristics shown in FIGS. 12A and 12B.

The optical fiber grating 200 according to the embodiment of the present disclosure satisfies –30 dB in the transmission loss in the light transmission blocking band, and can be used up to the –1625 nm wavelength band where high capacity transmission in the L-band is enabled.

Further, in the embodiment of the present disclosure, the inner cladding 220 may have a refractive index substantially equal to the refractive index of pure silica glass by offsetting an amount of increase in refractive index induced by the Ge-doping and an amount of decrease in refractive index induced by the B-doping. Further, the inner cladding 220 may be configured to have a refractive index substantially equal to the refractive index of the outer cladding 230. For example, in the configuration in which, in the inner cladding 220, an amount of increase in the refractive index induced by the Ge-doping is adjusted by an amount of decrease in the refractive index induced by the B-doping, and the outer cladding 230 contains chlorine (Cl), the refractive index of the inner cladding 220 may be substantially equal to the refractive index of the outer cladding 230.

In the above description, it is pointed out that the $\alpha$-profile of the present disclosure (FIG. 10) is superior to the conventional refractive index profile shown in FIG. 3 in that the transmission loss at 1625 nm can be suppressed. The other advantages will be described below.

Figure 13A:
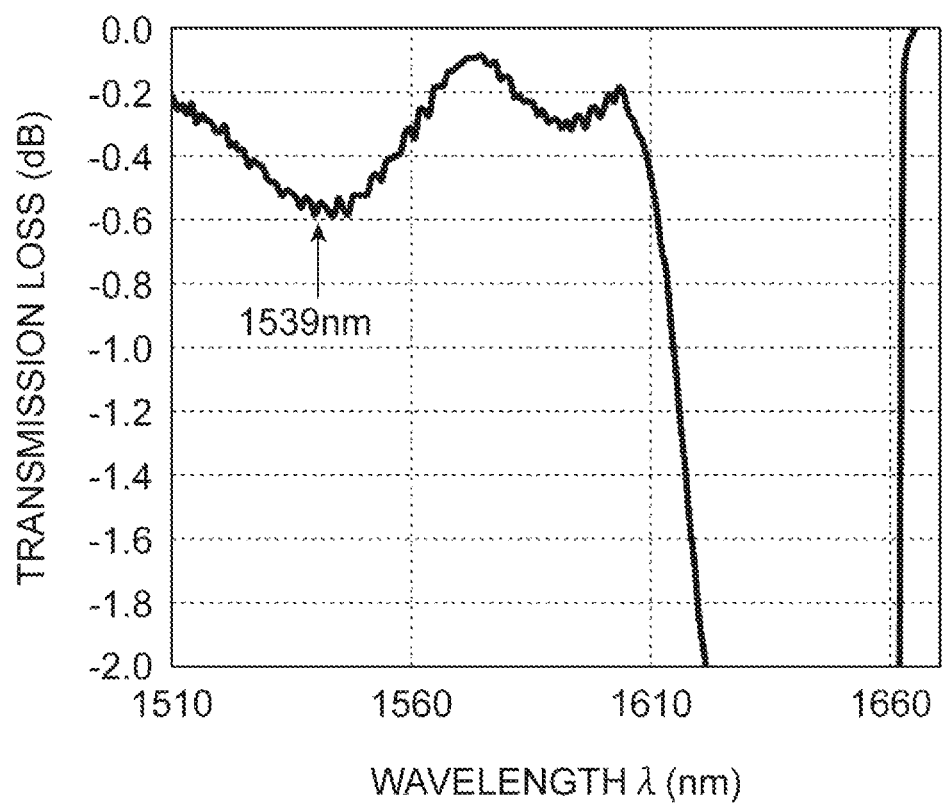
FIG. 13A is a diagram showing transmission characteristics of an optical fiber grating obtained by forming a grating in the optical fiber (FIG. 3) according to the first comparative example using a phase mask without varying a Gap width.
Figure 13B:
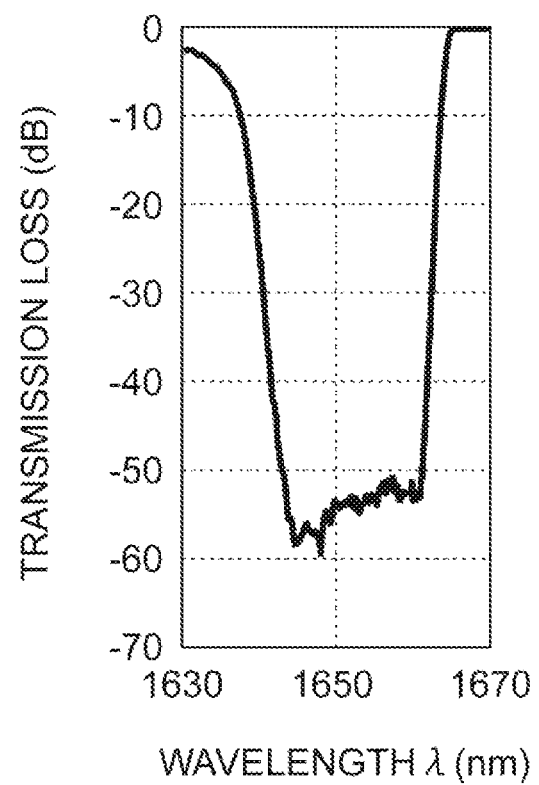
FIG. 13B is an enlarged view of a part of FIG. 13A.

In the writing of grating via the phase mask 400 as shown in FIG. 7, interference fringes of plus/minus first-order diffracted light are used. However, in this case, since interference fringes with different higher-order diffracted lights are also written at the same time, unnecessary transmission loss occurs near 1539 nm, for example, as shown in FIGS. 13A and 13B. Note that FIG. 13A shows transmission characteristics of the optical fiber grating 100 obtained by forming a grating, using a phase mask, in the optical fiber (having the step-index refractive index profile shown in FIG. 3) according to the first comparative example, without varying the Gap width (distance between the phase mask and the optical fiber). FIG. 13B is an enlarged view of a part of FIG. 13A. As a countermeasure against the above problem, a manufacturing method for writing a grating while varying the Gap width (distance between the phase mask and the fiber) has been proposed (see Patent Document 4 and Non-Patent Document 3 mentioned above).

Figure 14A:
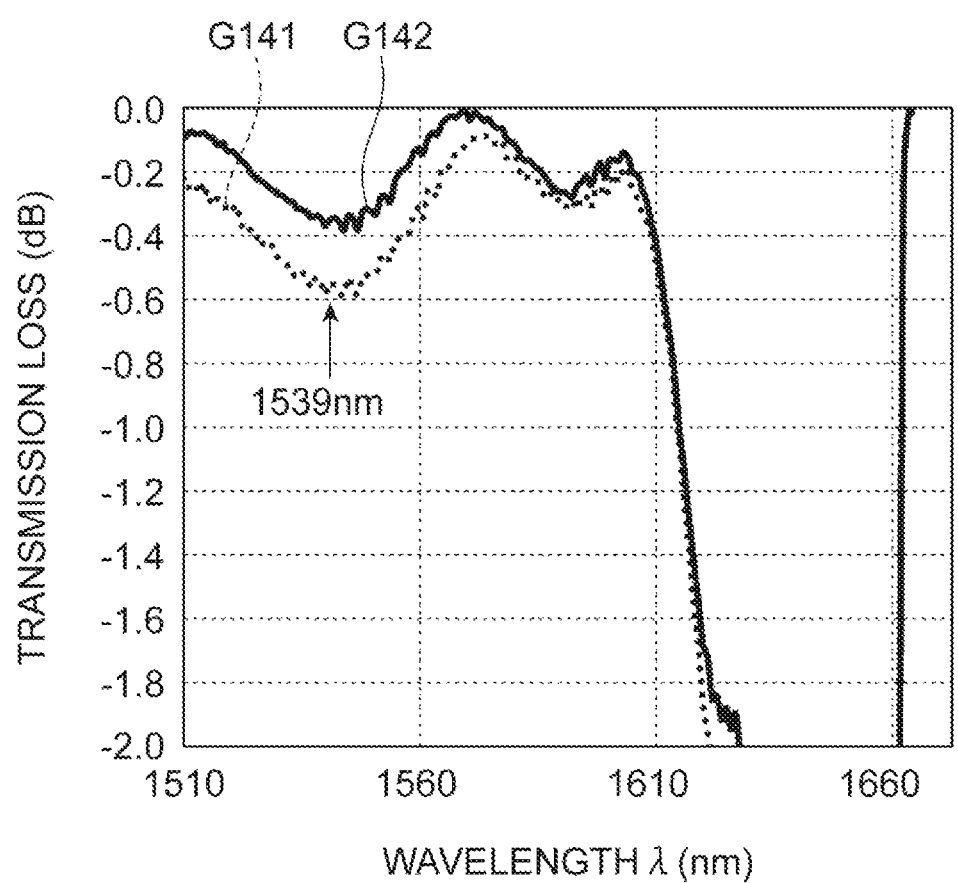
FIG. 14A is a diagram showing transmission characteristics when a Gap width is not varied, and transmission characteristics when a Gap width is varied, as transmission characteristics of an optical fiber grating obtained by forming a grating in the optical fiber (FIG. 3) according to the first comparative example using a phase mask.
Figure 14B:
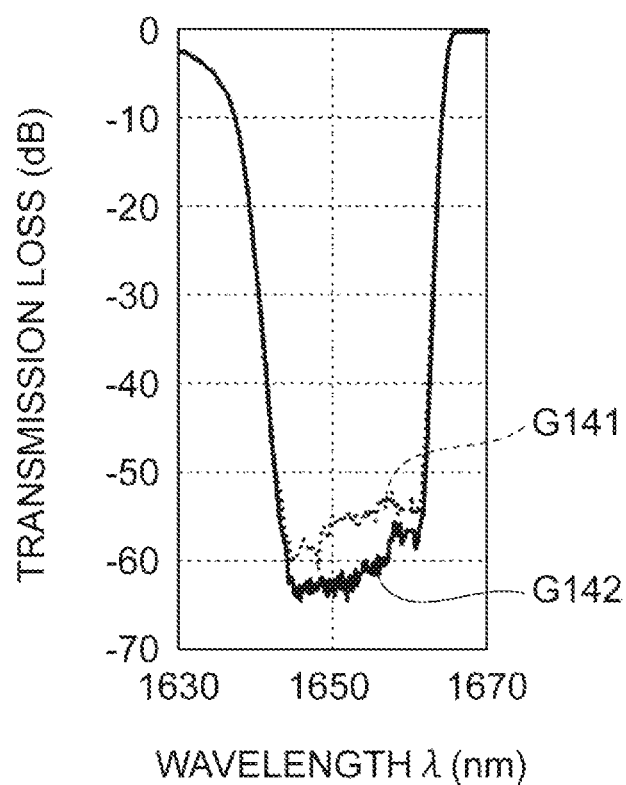
FIG. 14B is an enlarged view of a part of FIG. 14A.
Figure 15A:
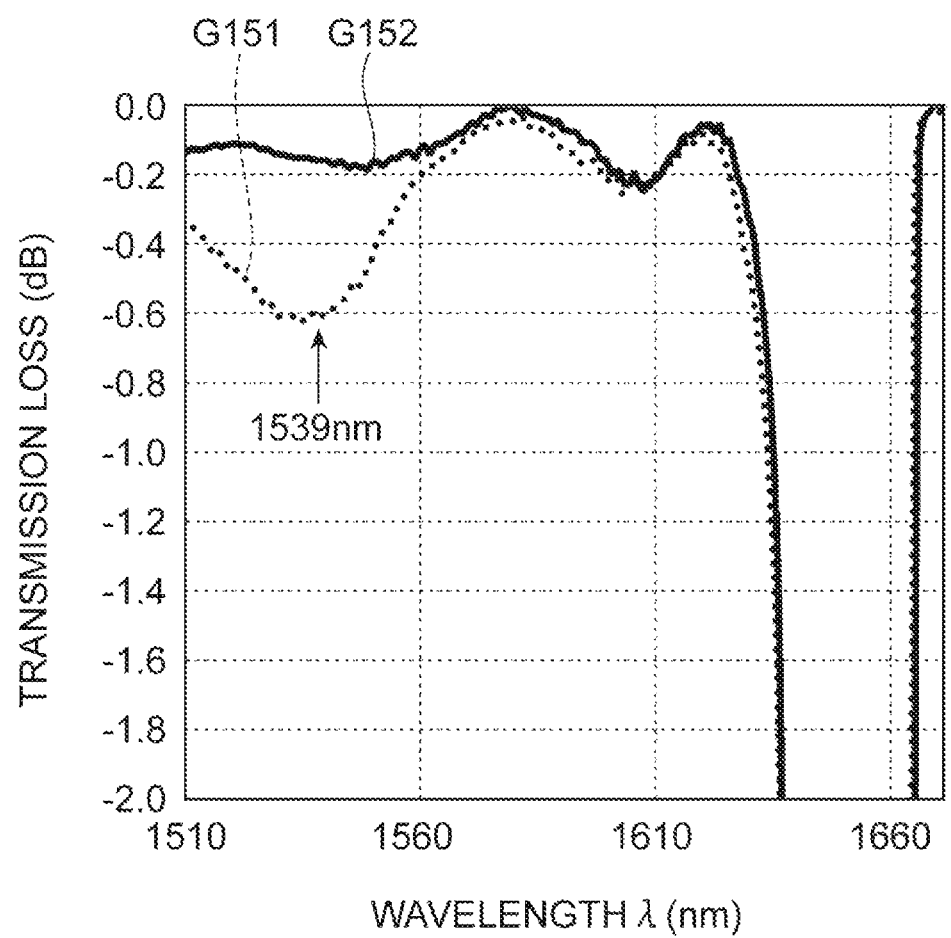
FIG. 15A is a diagram showing transmission characteristics when a Gap width is not varied, and transmission characteristics when a Gap width is varied, as transmission characteristics of an optical fiber grating obtained by forming a grating in the optical fiber according to the embodiment using a phase mask.
Figure 15B:
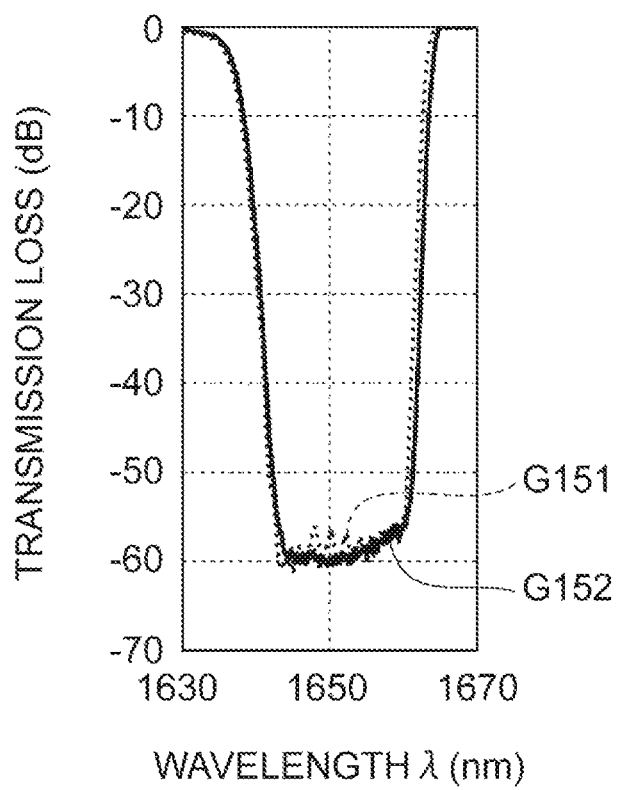
FIG. 15B is an enlarged view of a part of FIG. 15A.

The spectra when writing of grating is performed while varying the Gap width are shown in FIGS. 14A to 15B. Note that FIG. 14A shows the transmission characteristics of the optical fiber grating 100 obtained by forming a grating in the optical fiber (having the step-index refractive index profile shown in FIG. 3) according to the first comparative example by using the phase mask. FIG. 14B is an enlarged view of a part of FIG. 14A. In FIGS. 14A and 14B, a graph G141 shows the transmission characteristics when the Gap width is not varied, and a graph G142 shows the transmission characteristics when the Gap width is varied. Further, FIG. 15A shows the transmission characteristics of the optical fiber grating 200 obtained by forming a grating in the optical fiber (having the $\alpha$-profile shown in FIG. 10) according to the embodiment of the present disclosure by using the phase mask 400 as shown in FIG. 7. FIG. 15B is an enlarged view of a part of FIG. 15A. In FIGS. 15A and 15B, a graph G151 shows the transmission characteristics when the Gap width is not varied, and a graph G152 shows the transmission characteristics when the Gap width is varied.

It is confirmed from calculation that the unnecessary transmission loss in the vicinity of a wavelength of 1539 nm is caused by the interference between plus first-order diffracted light and plus third-order diffracted light. It is found that, in the sample having the $\alpha$-profile as well as in the sample having the step-index refractive index profile, the transmission loss at the wavelength of 1539 nm when the Gap width is varied is suppressed compared to the case where the Gap width is not varied. The range of variation of the Gap width in the comparison is 1 μm in each sample.

In order to suppress the transmission loss, a method for improving the performance of the phase mask (the performance can be improved by mask design or manufacturing method) is also considered in addition to the method for varying the Gap width. Regarding the performance of the phase mask, having "high performance" means that the efficiency in generating plus/minus third-order diffracted light is sufficiently smaller than the efficiency in generating plus/minus first-order diffracted light. However, the point to be stressed is that it is impossible to totally eliminate higher-order diffracted light, although the efficiency in generating the higher-order diffracted light can be suppressed by preparing a high-performance phase mask, and a Bragg wavelength different from a predetermined Bragg wavelength is formed due to an interference between plus/minus first-order diffracted light and plus/minus third-order diffracted light. That is, unnecessary transmission loss occurs in the C-band. With the phase mask used in this embodiment, the transmission loss in the wavelength band including 1539 nm is suppressed from −0.55 dB to −0.35 dB by varying the Gap width during writing of the grating. If a high-performance phase mask is prepared, further suppression is expectable, but there is a limit in suppression by improving only the phase mask.

Figure 16A:
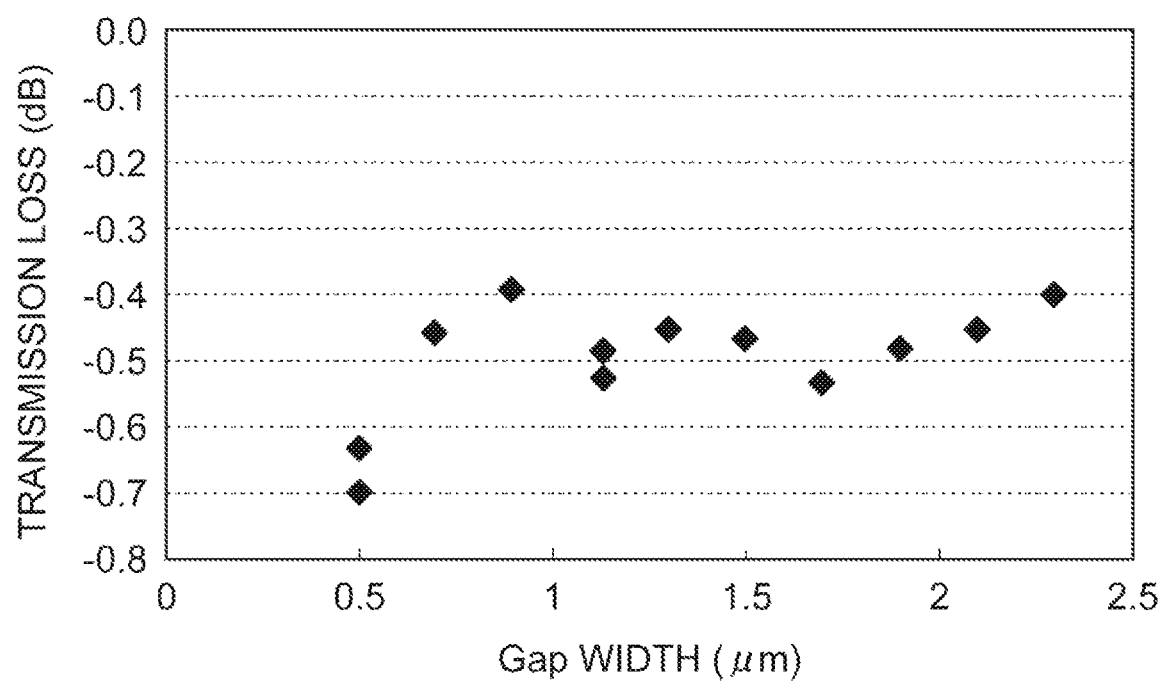
FIG. 16A is a graph showing a relationship between a Gap width and a transmission loss in the optical fiber grating using the optical fiber according to the first comparative example.
Figure 16B:
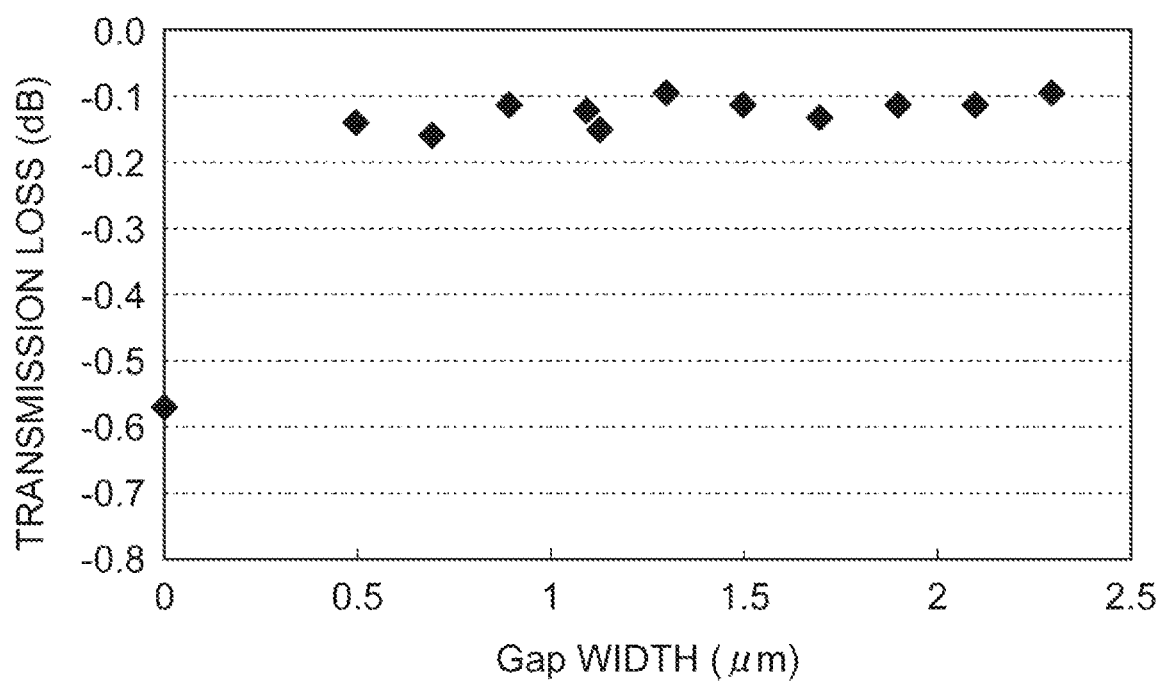
FIG. 16B is a graph showing a relationship between a Gap width and a transmission loss in the optical fiber grating using the optical fiber according to the embodiment.

The range of variation of the Gap width in FIGS. 14A to 15B described above is constant at about 1 µm, but it is estimated that there is an appropriate range of variation of the Gap width depending on the structural variation in the longitudinal direction of the fiber. In this case, the Gap width of 1 µm may not be an appropriate range. In view of this, grating writing characteristics were examined for the optical fiber having a refractive index profile of an α-profile and the optical fiber having a step-index refractive index profile, using the Gap width as a parameter (FIGS. 16A and 16B). Note that FIG. 16A is a graph showing a relationship between a Gap width and a transmission loss in the optical fiber grating 100 using the optical fiber according to the first comparative example. FIG. 16B is a graph showing a relationship between a Gap width and a transmission loss in the optical fiber grating 200 using the optical fiber according to the embodiment of the present disclosure. In FIGS. 16A and 16B, the horizontal axis represents a Gap width (µm) and the vertical axis represents the maximum transmission loss in the wavelength band from 1500 nm to 1580 nm including the C-band. During the production of the optical fiber gratings of the measurement samples, the phase mask used for producing the optical fiber grating having the transmission characteristics shown in FIGS. 14A to 15B was used. The UV irradiation conditions during the production were set such that substantially the same level of transmission loss occurred in the 1650-nm wavelength band.

It is found that, in the sample having the step-index refractive index profile (FIG. 16A), the maximum range of suppression of the transmission loss due to the Gap width being varied was 0.3 dB. The transmission loss was suppressed by the variation in the Gap width, and the difference between the maximum value and the minimum value of the transmission loss that converged at a certain value with the Gap width of 1 µm or more was Δ0.15 dB. On the other hand, in the sample having the α-profile (FIG. 16B), the maximum range of suppression of transmission loss was 0.4 dB, and the difference between the maximum value and the minimum value of transmission loss with a Gap width of 1 µm or more was Δ0.05 dB.

It is found that the range of suppression of the transmission loss of the optical fiber grating 200 having the α-profile is improved by 0.1 dB as compared with the optical fiber grating 100 having the step-index refractive index profile, which shows that the optical fiber grating 200 is superior. The point to be noted is that the dependence of transmission loss on the Gap width in the sample having the α-profile is smaller than that in the sample having the step-index refractive index profile. That is, it is found that, even if an amount of variation in the Gap width (amount of deviation from the set Gap width) is unexpectedly great because of variations in the structure in the longitudinal direction of the fiber, variations in alignment, etc., the sample having the α-profile has greater manufacturing tolerance than the sample having the step-index refractive index profile, and thus is effective in manufacture.

REFERENCE SIGNS LIST

200 . . . Optical fiber grating; 210 . . . Core; 220 . . . Inner cladding; 230 . . . Outer cladding; 300 . . . Photosensitive region; and 400 . . . Phase mask.

The invention claimed is:

1. An optical fiber comprised of silica-based glass, the optical fiber comprising:
a core having a single-peaked and graded refractive index profile;
an inner cladding surrounding the core and having a refractive index lower than a maximum refractive index of the core; and
an outer cladding surrounding the inner cladding and having a refractive index lower than the maximum refractive index of the core,
wherein the optical fiber including a photosensitive region constituted by the core and the inner cladding contains a photosensitive material, and
the inner cladding has an outer diameter one time or more and two times or less a mode field diameter of an $LP_{01}$ mode in a 1310-nm wavelength band.

2. The optical fiber according to claim 1, wherein the photosensitive region contains both Ge and B as the photosensitive material.

3. The optical fiber according to claim 2, wherein
a difference between a maximum concentration and a minimum concentration of the B in the photosensitive region is 0.3% or less in terms of a difference between a variation in relative refractive index induced by B-doping with the maximum concentration and a variation in relative refractive index induced by the B-doping with the minimum concentration, and
a concentration of the Ge in an outermost region of the photosensitive region is 0.35% or more in terms of a variation in relative refractive index induced by Ge-doping.

4. The optical fiber according to claim 3, wherein the refractive index of the inner cladding is substantially equal to a refractive index of pure silica glass because of an offset between an amount of increase in refractive index induced by the Ge-doping and an amount of decrease in refractive index induced by the B-doping.

5. The optical fiber according to claim 3, wherein
in the inner cladding, an amount of increase in refractive index induced by the Ge-doping is greater than an amount of decrease in refractive index due induced by the B-doping,
the outer cladding contains chlorine, and
the refractive index of the inner cladding and the refractive index of the outer cladding are substantially equal to each other.

6. The optical fiber according to claim 1, wherein the single-peaked and graded refractive index profile is an α-profile having an exponent α greater than 0.5 and smaller than 5.0.

7. The optical fiber according to claim 1, wherein a relative refractive index difference between the core and the inner cladding is 0.4% or more.

8. An optical fiber grating comprising the optical fiber according to claim 1, wherein
the photosensitive region in the optical fiber includes a refractive index modulated region where the refractive index periodically varies along a longitudinal direction of the optical fiber.

* * * * *